DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 23, 1970

875 O.G. 383

T875,020

ENZYME-CONTAINING DETERGENT COMPOSITIONS

Joseph Dulat, Fetcham, Surrey, John Frederick Collins, Chessington, Surrey, Walter Jacob Rosenfelder, London, and John Malcolm Schofield, Farnham, Surrey, England, assignors to United States Borax & Chemical Corporation, Los Angeles, Calif.

Filed July 9, 1969, Ser. No. 840,493

Claims priority, application Great Britain, July 24, 1968, 35,396/68

Int. Cl. C11d *3/065, 3/066*

U.S. Cl. 252—138

No Drawing. 11 Pages Specification

Detergent compositions containing an enzyme and a combination of sodium phosphate and borate, especially a sodium borate such as borax. The compositions give better stain-removal than obtained without the borate-phosphate combination builder. The borate has the formula $M_2O{:}xB_2O_3$ in which M is an alkali metal or ammonium ion and $x$ is 1 to 5. The improved cleaning composition comprises a proteolytic enzyme, a detergent and a builder which consists of at least one sodium phosphate, such as sodium tripolyphosphate, and from 10% to 90% by weight of at least one borate. Preferably the proportion of borate to phosphate is in the range of about 1:3 to about 3:1.